United States Patent
Du et al.

(10) Patent No.: US 8,980,362 B2
(45) Date of Patent: Mar. 17, 2015

(54) POWDERED BEVERAGE COMPRISING FRUIT OR VEGETABLE PULP

(75) Inventors: Si-Ze Du, Beijing (CN); Yongcheng Liao, Beijing (CN); Hua Bai, Shanghai (CN)

(73) Assignee: Nestec S.A., Vevey (CH)

( * ) Notice: Subject to any disclaimer, the term of this patent is extended or adjusted under 35 U.S.C. 154(b) by 160 days.

(21) Appl. No.: 13/805,790

(22) PCT Filed: Mar. 25, 2011

(86) PCT No.: PCT/EP2011/054658
§ 371 (c)(1),
(2), (4) Date: Dec. 20, 2012

(87) PCT Pub. No.: WO2012/000691
PCT Pub. Date: Jan. 5, 2012

(65) Prior Publication Data
US 2013/0089652 A1 Apr. 11, 2013

(30) Foreign Application Priority Data

Jun. 30, 2010 (CN) .......................... 2010 1 0225074

(51) Int. Cl.
*A23L 1/212* (2006.01)
*A23L 2/02* (2006.01)
*A23L 2/39* (2006.01)
*A23L 2/52* (2006.01)
(Continued)

(52) U.S. Cl.
CPC ................. *A23L 2/02* (2013.01); *A23L 1/2128* (2013.01); *A23L 2/39* (2013.01); *A23L 2/52* (2013.01); *A23L 2/60* (2013.01); *A23L 2/395* (2013.01)

USPC ........... 426/640; 426/581; 426/519; 426/615; 426/658

(58) Field of Classification Search
CPC ........... A23L 1/2128; A23L 2/39; A23L 2/60; A23L 1/2121
USPC .................................. 426/615, 658, 518, 519
See application file for complete search history.

(56) References Cited

U.S. PATENT DOCUMENTS

| | | |
|---|---|---|
| 4,104,414 A | 8/1978 | Rahman et al. |
| 4,233,334 A | 11/1980 | Owades |

(Continued)

FOREIGN PATENT DOCUMENTS

| | | |
|---|---|---|
| DE | 216618 | 12/1984 |
| DE | 202010001912 | 2/2011 |
| FR | 2914540 | 10/2008 |

OTHER PUBLICATIONS

International Search Report corresponding to related International Patent Application No. PCT/EP2011/054658 mailed Jul. 27, 2011.
(Continued)

*Primary Examiner* — Helen F Heggestad
(74) *Attorney, Agent, or Firm* — K&L Gates LLP

(57) ABSTRACT

The present invention relates generally to the field of food and beverages. In particular, the present invention relates to a powdered beverage comprising fruit or vegetable pulp. Embodiments of the present invention relate to compositions comprising dry fruit or vegetable pulp and sugar powder, wherein the size of the sugar powder particles and pulp particles is selected in a way that, e.g., segregation of low density pulp particles is avoided during transportation and storage time.

13 Claims, 4 Drawing Sheets

(51) Int. Cl.
*A23L 2/60* (2006.01)
*A23L 2/395* (2006.01)

(56) References Cited

U.S. PATENT DOCUMENTS

2009/0035441 A1* 2/2009 Hirashima et al. ............ 426/599

2011/0008514 A1 1/2011 Spelman

OTHER PUBLICATIONS

International Written Opinion corresponding to related International Patent Application No. PCT/EP2011/054658 mailed Jul. 27, 2011.

* cited by examiner

Figure 1:
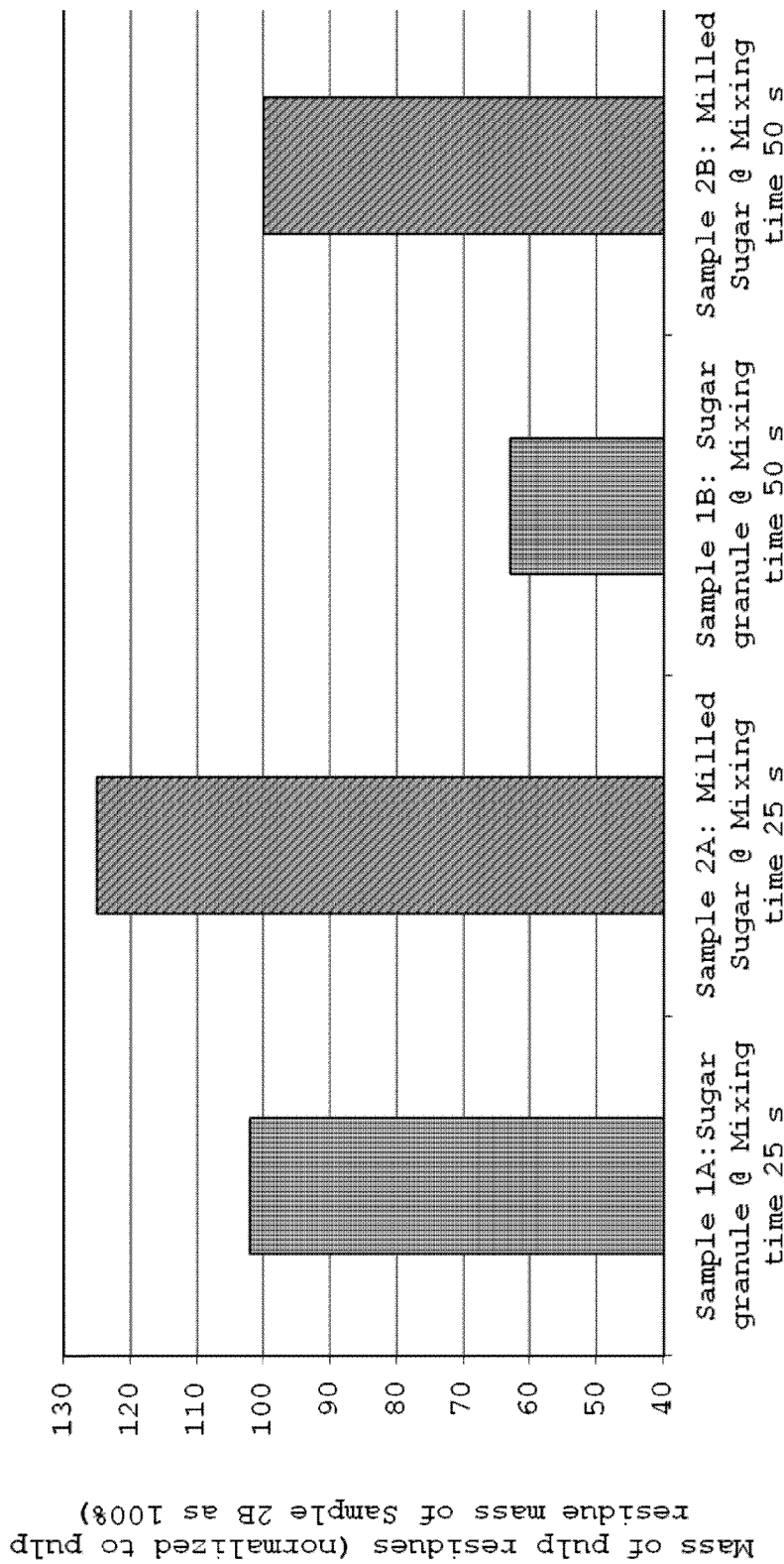

Figure 1: Influence of Sugar Particle Size on Pulp Breakage after Mixing

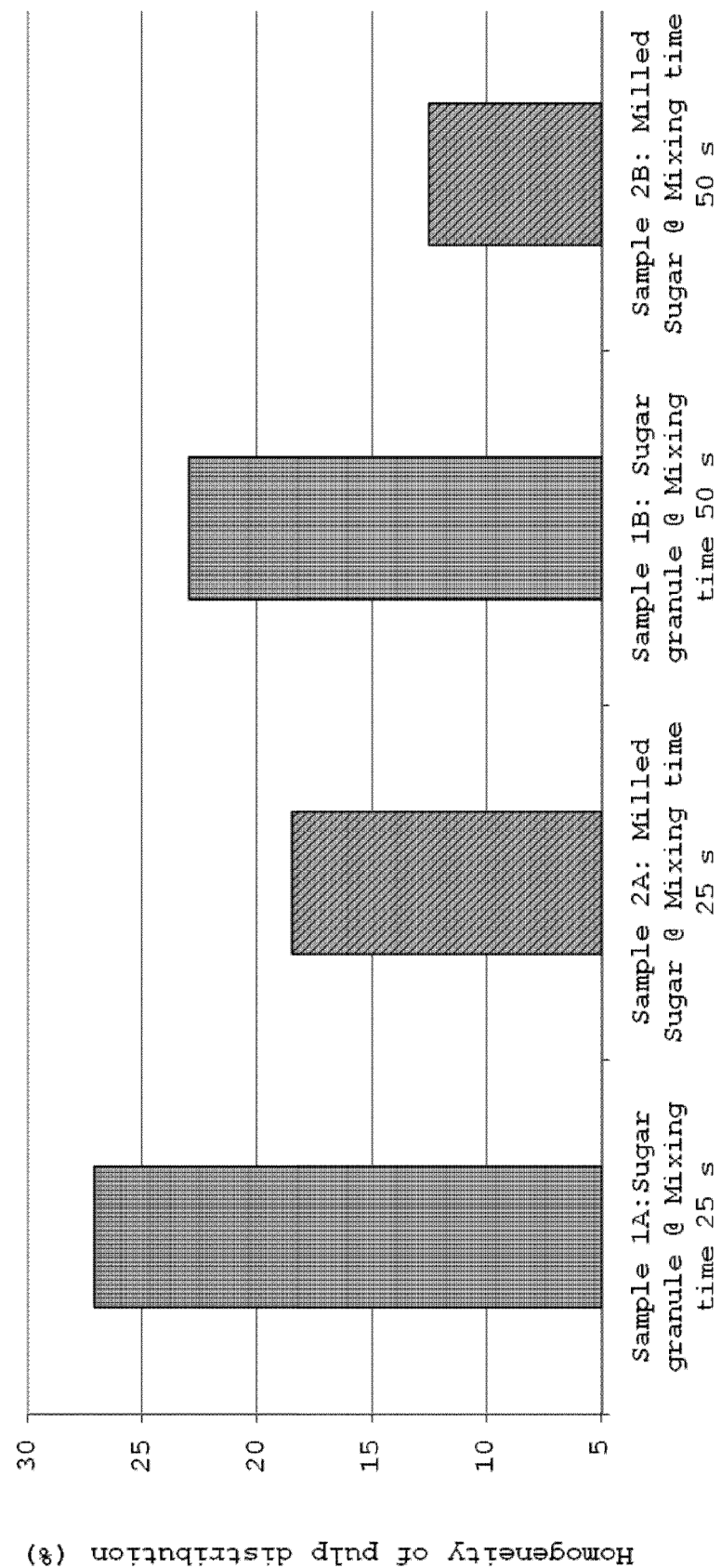

POWDERED BEVERAGE COMPRISING FRUIT OR VEGETABLE PULP

CROSS REFERENCE TO RELATED APPLICATIONS

The present application is a National Stage of International Application No. PCT/EP2011/054658, filed on Mar. 25, 2011, which claims priority to Chinese Patent Application No. 201010225074.7, filed on Jun. 30, 2010, the entire contents of which are being incorporated herein by reference.

The present invention relates generally to the field of food and beverages. In particular, the present invention relates to a powdered beverage comprising fruit or vegetable pulp. Embodiments of the present invention relate to compositions comprising dry fruit or vegetable pulp and sugar powder, wherein the size of the sugar powder particles and pulp particles is selected in a way that, e.g., segregation and breakage of low density pulp particles is avoided during production, transportation and storage time.

Beverages on the basis of fruit juices or fruit flavours are generally well-liked by consumers and are perceived as refreshing, in particular during the warm season, while at the same time they generally are beneficial to the consumer's health.

Sometimes it is not possible or too expensive to produce such beverages directly from fresh fruits due to seasonal or regional limitation. In such cases, beverages on the basis of fruit juices or fruit flavours are produced from concentrate, e.g. from powdered beverages.

The presence of pulp particles in beverage is considered as pleasant by the consumer as it more closely resembles the mouth feel of freshly squeezed fruit juices, for example. However, the application of dehydrated fruit pulp to powder beverage to deliver a pulp mouthfeel after reconstitution is difficult due to variable reasons, e.g. cost, or technical limitations.

Some patent applications have been published in this respect.

For example, U.S. Pat. No. 4,233,334 discloses a dry powdered beverage mix adapted to be reconstituted in cold water. The powdered mix includes beaten cellulose pulp, which imparts an appearance and mouth-feel resembling freshly squeezed natural juice. When preparing the dry powdered beverage mix, the beaten pulp is mixed with sugar, and the pulp/sugar mixture is air dried to form a dry cake which is then crushed to a powder.

EP0098120B1 addresses the problem that natural citrus pulp often is not easy to rehydrate after drying and hence often clumps and generates particles with a high density. It is suggested to adjust the pH of citrus pulp to at least 4.0 before freeze drying the pulp to a moisture content of less than 10 weight-% and grinding it. This way a dried citrus pulp with improved wetting and dispersion characteristics is obtained.

However, the presence of sugar particles and pulp particles, e.g. in a powdered beverage composition, has the consequence that the robust and sharp edged sugar particles grind the pulp particles and—consequently—destroy at least in part the pulp structure. Similar friction effects can also be observed in between the pulp particles. This happens in particular during production and transport, but also during storage times. Additionally, the relatively low density pulp could not be easily mixed to homogeneity with sugar particles during processing. Further segregation could be observed during transportation and storage.

The results are pulp particle segregation, impaired hydration properties, and an impaired mouthfeel of the final product after reconstitution with milk or water.

The present inventors have addressed these needs.

Hence, it was the object of the present inventors to improve the state of the art and to provide a composition comprising dried fruit or vegetable pulp and sugar that can be used, for example, to prepare beverages, and that at least in part avoids the separation and breakage of low density dehydrated pulp particles from sugar, e.g., during mixing, packaging, transportation, and storage.

The inventors were surprised that they could achieve this object by the subject matter of the independent claims. The subject matter of the dependant claims further develops the idea of the present invention.

The inventors have found that by using fruit or vegetable pulp particles of a specific size in combination with sugar particles of a specific size the grinding effect of the sugar particles on the pulp can largely be avoided. The inventors were successful at significantly preventing the separation of low density dehydrated pulp particles from sugar during mixing process, packaging, transportation, and storage.

Without wishing to be bound by theory the present inventors believe that the observed effect can be explained as follows:

A high density sugar powder with a small particle size will embed into the holes of the dehydrated pulp cell structure and—consequently—increase the relative density of the pulp. This will prevent the separation of low density dehydrated pulp particles from sugar, and will stabilize the pulp cell structure from inside while preventing unwanted breakage of the pulp due to friction during processing and storage.

Consequently, one embodiment of the present invention is a composition comprising dry fruit or vegetable pulp and sugar powder. The sugar powder may have a particle size distribution D(0.5) of less than 0.3 mm, and the pulp in a dehydrated state may have more than 80% of the particles with a size in the range between 0.5 mm to 20 mm.

The size refers to the diameter of the particles.

Such sugar particles may for example be obtained by specific milling procedures, optionally followed by the application of sieves.

For example, at least 80 weight-% of the pulp particles in a dehydrated state may have an average diameter in the range 0.5-20 mm, preferably 0.5-4 mm. Such pulp particles may also be obtained by cutting the pulp in a dried or wet state to the desired size, optionally followed by the application of sieves.

A dry fruit or vegetable pulp may have a water content of less than 15 weight-%, for example less than 9 weight-%, or less than 5 weight-%. The composition of the present invention may have a water content of less than 15 weight-%, for example less than 7 weight-%, or less than 4 weight-%, for example less than 2 weight-%.

The composition may be provided in the form of a powder, e.g., a shelf stable powder.

Shelf stability can be obtained, for example by providing the composition with a water activity smaller than 0.4, for example in the range of 0.39-0.05, preferably smaller than 0.20. Water activity or $a_w$ is a measurement of the energy status of the water in a system. It is defined as the vapour pressure of water divided by that of pure water at the same temperature; therefore, pure distilled water has a water activity of exactly one.

The sugar powder may be produced from any food grade sugar known in the art. It is preferred to use sugars that deliver sweetness with no off-tastes. For example the sugar powder may be made from the group of sugars consisting of sucrose, dextrose, lactose, glucose, fructose or a combination thereof.

The pulp may be artificial pulp or natural pulp or a mixture of both. Natural pulp has the advantage that it makes the beverage more nature-like and closer resembles the content of beverages prepared directly from fruits or vegetables. However, occasionally, natural pulp material may be more difficult to handle in industrial processing. Artificial pulp has the advantage that it can be produced exactly according to the needs. Mixtures of artificial and natural pulp may be used to ensure a composition of the final beverage that is as close to natural as possible, while being easier to handle in production. For example, the pulp may contain at least 10 weight-%, at least 20 weight-%, at least 30 weight-%, at least 40 weight-%, at least 50 weight-%, at least 60 weight-%, at least 70 weight-%, at least 80 weight-%, or at least 90 weight-% of a water insoluble fruit fraction. The pulp may also consist of a water insoluble fruit fraction.

The pulp may be obtained from edible fruit or vegetables. "Edible" means a material that is approved for human or animal consumption.

For example, the pulp may be obtained from fruit of the genus citrus fruits, for example oranges, tangerines, lemons, grapefruits, pomelos; o apples; peaches; pineapples; cherries; apricots; grapes; guava; sapodillas; tomatoes; mangos; bananas; or combinations thereof.

Orange pulp is widely used and may hence be a preferred example.

Food additives and/or other food ingredients may be added.

Pulp material and sugar may be used in any desired proportion. The amount of sugar used may for example depend on the desired acidity of the final beverage. Clearly, lemon drinks will usually contain more added sugar than vegetable beverages. The amount of sugar particles may also be used to adjust the density of the pulp particles, as the sugar will enter holes and gaps in the surface of the pulp structure.

For example, the pulp and the sugar powder may be present in the composition in a weight ratio in the range of 1:500 to 1:5.

The ideal shakedown density of the pulp particles will depend on a number of factors such as the overall average size of the pulp particle as well as the nature and density of the origin composition that was used to produce the pulp particles of the present invention.

The shakedown density may also be modified by the incorporation of sugar particles into the pulp particles.

"Shakedown density" or "tap density" of a powder is understood in the art as the ratio of its mass to the volume it occupies after it has been subjected to a fixed number of taps under specified conditions (e.g. in 30 seconds, manual jolt density meter 100 times with 8.5 height of stroke using 500 mL Stainless steel). It is conventionally expressed in grams per milliliter.

For example, the pulp particles in the composition of the present invention may have a shaken down density in the range of 0.02 g/mL to 0.40 g/mL.

The fruit or vegetable pulp may be obtained by any method that is known in the art.

For example, the pulp may be obtainable by a drying process, for example, air drying, freeze draying, roller drying, spray drying, vacuum drying, microwave drying, or combinations thereof.

The sugar may be added to the pulp material. Ideally the sugar is at least partially embedded in the pores of the pulp cell structure. For example, at least 5%, at least 10%, at least 15%, or at least 20% pulp weight of the sugar is embedded in the pores of the pulp cell structure.

The composition of the present invention may be used to prepare any kind of edible composition. Edible compositions include beverages. The composition will generally be liquid prior to consumption, but this does not have to be the case. The composition may also be to be consumed in the dry state or may be to be incorporated into other compositions, for example gel like compositions or creamy compositions such as yoghurts, ice creams or puddings. The compositions of the present invention may also be to be incorporated into dry preparations such as cakes, for example.

In one embodiment of the present invention the composition is a powdered beverage or may be a part of a powdered beverage.

Such a powdered beverage comprises the composition of the present invention.

For example, the powdered beverage may contain at least 20 weight-%, at least 30 weight-%, at least 40 weight-%, or at least 50 weight-% of the composition of the present invention in the dry state. Food additives and/or further food ingredients may be added.

The composition of the present invention may be used to prevent the segregation of low density dehydrated fruit pulp particles in powdered products during processing, packaging and transportation.

Particulate solids tend to segregate by virtue of differences in the size, density, shape and other properties. The process of segregation may occur during the preparation as well as during subsequent handling of the composition of the present invention. Typically, segregation is pronounced with free flowing powders.

The composition of the present invention may further be used to protect the pulp structure from breakage during processing, packaging and transportation It may also be used to provide improved re-hydration properties and/or an improved mouthfeel.

The above described effects may be particularly well achieved if the composition is in powder form and in accordance with the present invention, the powdered composition could achieve a degree of homogeneity with a coefficient of variation of at most 25%.

Those skilled in the art will understand that they can freely combine all features of the present invention described herein, without departing from the scope of the invention as disclosed. In particular, features described for the composition, and/or the powdered beverage of the present invention may be applied to the uses of the present invention and vice versa. Features described for the composition of the present invention may also apply to the powdered beverage of the present invention and vice versa.

Further advantages and features of the present invention are apparent from the following Examples and Figures.

Figure 2:
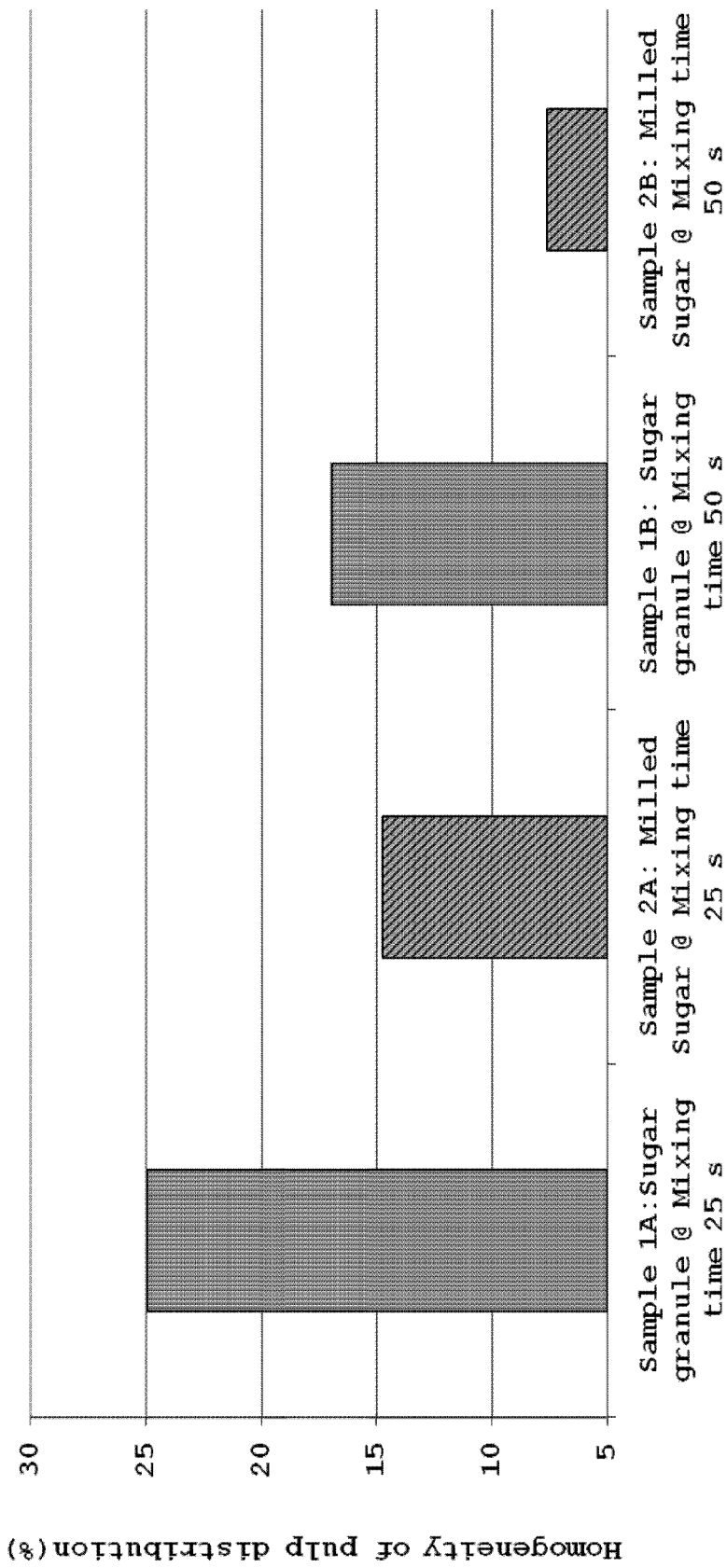

FIG. 1 and FIG. 2 show less breakage of pulps and improved homogeneity of pulp distribution in samples processed by mixing pulp with milled sugars in accordance with the present invention. FIG. 1 shows the influence of sugar particle size on pulp breakage after mixing. FIG. 2 shows the influence of sugar particle size on pulp homogeneity after mixing.

Figure 3:
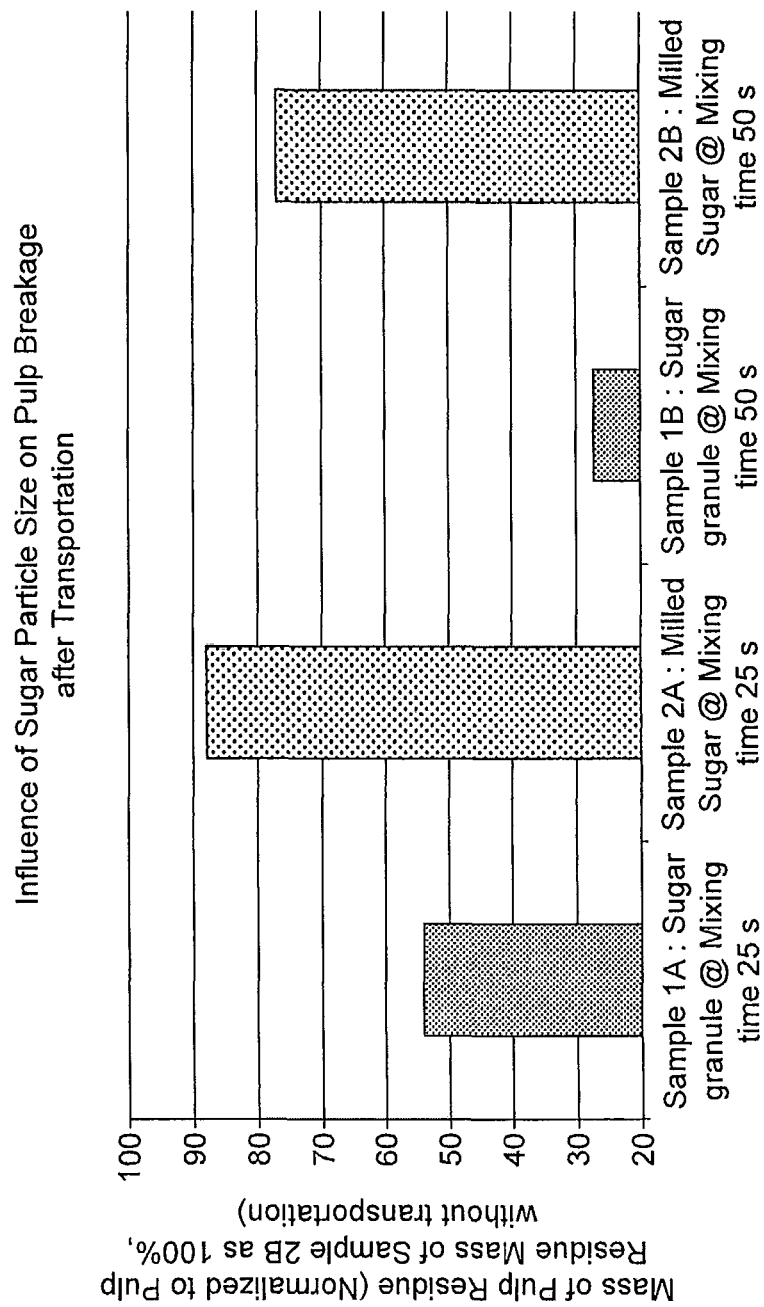

FIG. 3 and FIG. 4 show less breakage of pulp and improved homogeneity of pulp distribution in the samples processed by mixing pulp with milled sugar according to the present invention in a transportation test. FIG. 3 shows the influence of sugar particle size on pulp breakage in a transportation test. FIG. 4 shows the influence of sugar particle size on pulp homogeneity in a transportation test.

EXAMPLES

Example 1 (Comparative)

In a blender, mix pulp with sugar granule for different durations (e.g. 25 s for sample 1A and 50 s for sample 1B), particle size of sugar granules had the D (0.5) value equal to 0.45 mm and hence outside the claimed range, 6 samplings were randomly taken out from the blender, finally products remained in the blender was packaged in commercial packaging.

Example 2

In the same blender used for sample 1, mix pulp with milled sugar for different durations (e.g. 25 s for sample 2A and 50 s for sample 2B), particle size of milled sugar had the D (0.5) value equal to 0.28 mm and hence within the claimed range. 6 samplings were randomly taken out from the blender, finally products remained in the blender was packaged in commercial packaging.

Homogeneity test of samples: the samples were sieved by hand, the average mass and Standard deviation (STDEV) of pulp residues of collected at the sampling points were calculated, and the coefficient of variance (homogeneity coefficient) was deduced by applying the following equation: STDEV/Average*100. In general, a smaller value of homogeneity coefficient means a better distribution of pulp in the samples.

Transportation test of samples: packs of the different samples were subjected to round-trip transportation between two cities by truck (>1000 km apart from each other); turnover was avoided during whole operation.

Homogeneity test of transportation samples: the transported packs were carefully opened and the samples were sampled from top to bottom reflecting normal consumption way. All samples were sieved by hand, the mass of pulp residues was recorded, the average mass and Standard deviation (STDEV) of pulp residues of sample 1A, sample 1B, sample 2A and sample 2B were calculated, and the coefficient of variance (homogeneity coefficient) was deduced by applying the following equation: STDEV/Average*100.

The invention claimed is:

1. Composition comprising dry fruit or vegetable pulp and sugar powder with a particle size distribution D(0.5) of less than 0.3 mm, the pulp in a dehydrated state has more than 80% particles of a size between 0.5 mm to 20 mm.

2. Composition in accordance with claim 1, wherein the sugar powder is made from a sugar selected from the group consisting of sucrose, dextrose, lactose, glucose, fructose and a combination thereof.

3. Composition in accordance with claim 1, wherein the pulp contains at least 10 weight-% of a water insoluble fruit fraction.

4. Composition in accordance with claim 1, wherein the pulp and the sugar powder are present in a weight ratio of 1:500 to 1:5.

5. Composition in accordance with claim 1, wherein the pulp particles have a shakedown density in the range of 0.02 $g/cm^3$ to 0.40 $g/cm^3$.

6. Composition in accordance with claim 1, wherein the pulp is obtained from fruit selected from the group consisting of oranges; tangerines; lemons; grapefruits; pomelos; and apples; peaches; pineapples; cherries; apricots; grapes; guava; sapodillas; tomatoes; mangos; bananas; and combinations thereof.

7. Composition in accordance with claim 1, wherein the pulp is obtainable by a drying process.

8. Composition in accordance with claim 1, wherein the sugar is at least partially embedded in the pores of the pulp cell structure.

9. Powdered beverage comprising:
   a composition comprising dry fruit or vegetable pulp and sugar powder with a particle size distribution D(0.5) of less than 0.3 mm, the pulp in a dehydrated state has more than 80% particles of a size between 0.5 mm to 20 mm.

10. Powdered beverage in accordance with claim 9 containing at least 20 weight-% of the dry fruit pulp composition in the dry state.

11. A method for preventing the segregation of low density dehydrated fruit pulp particles in powdered products during processing, packaging and transportation, the method comprising:
    combining dry fruit or vegetable pulp and sugar powder with a particle size distribution D(0.5) of less than 0.3 mm, the pulp in a dehydrated state has more than 80% particles of a size between 0.5 mm to 20 mm to make a product.

12. Method in accordance with claim 11, wherein the powdered product has a degree of homogeneity with a coefficient of variation of at most 25%.

13. A method for protecting the pulp structure from breakage during processing, packaging and transportation, and/or improving re-hydration properties and/or improving mouthfeel, the method comprising:
    combining dry fruit or vegetable pulp and sugar powder with a particle size distribution D(0.5) of less than 0.3 mm, the pulp in a dehydrated state has more than 80% particles of a size between 0.5 mm to 20 mm to make a product.

* * * * *